US010635056B2

(12) United States Patent
Irisarri et al.

(10) Patent No.: US 10,635,056 B2
(45) Date of Patent: Apr. 28, 2020

(54) MODEL AND CONTROL VIRTUAL POWER PLANT PERFORMANCE

(71) Applicant: Open Access Technology International, Inc., Minneapolis, MN (US)

(72) Inventors: Guillermo Irisarri, Plymouth, MN (US); Sasan Mokhtari, Eden Prairie, MN (US); Ali Ipakchi, San Carlos, CA (US); Abdolhossein Rahimi, Redwood City, CA (US); Jose Medina Palomo, Minneapolis, MN (US); Farrokh Albuyeh, San Carlos, CA (US); Benham Danai, Cupertino, CA (US)

(73) Assignee: Open Access Technology International, Inc., Minneapolis, MN (US)

( * ) Notice: Subject to any disclaimer, the term of this patent is extended or adjusted under 35 U.S.C. 154(b) by 828 days.

(21) Appl. No.: 14/216,247

(22) Filed: Mar. 17, 2014

(65) Prior Publication Data

US 2014/0277808 A1    Sep. 18, 2014

Related U.S. Application Data

(60) Provisional application No. 61/794,067, filed on Mar. 15, 2013.

(51) Int. Cl.
*G05B 15/02* (2006.01)
*H02J 3/14* (2006.01)
(Continued)

(52) U.S. Cl.
CPC ............ *G05B 15/02* (2013.01); *G06Q 50/06* (2013.01); *H02J 3/14* (2013.01);
(Continued)

(58) Field of Classification Search
None
See application file for complete search history.

(56) References Cited

U.S. PATENT DOCUMENTS 6,421,571 B1 * 7/2002 Spriggs .................. G05B 15/02
345/629
9,331,511 B2 * 5/2016 Becker .................... H02J 7/007
(Continued)

OTHER PUBLICATIONS

Zurborg, A., "Unlocking Customer Value: The Virtual Power Plant", 2010, WorldPower.*
(Continued)

*Primary Examiner* — Mohammad Ali
*Assistant Examiner* — Kelvin Booker
(74) *Attorney, Agent, or Firm* — Vidas Arrett & Steinkraus P.A.

(57) ABSTRACT

A system and process/method of modeling demand-response (DR) and distributed-energy resource (DER) assets is provided, facilitating the aggregation of said assets in virtual power plants (VPPs), and using VPPs to provide energy balancing services needed to minimize the impact of Variable Energy Resources (VER) on power system. The method accurately accounts for assets by qualifying assets based on various parameters and by forecasting the capabilities of the resulting VPPs for provision of balancing services. Asset performance factors that may affect the aggregated VPP's capabilities are monitored and recalculated when necessary. Near-term forecasted VPP capability is compared to near-term forecasted imbalances in the electric-power-supply system, and the VPP is dispatched to minimize the system imbalances. The dispatch signal is disaggregated to control commands to individual assets. This process provides a reliable and cost effective approach to support higher penetrations of renewable generation in the electric power system.

27 Claims, 7 Drawing Sheets

System Process Overview

(51) Int. Cl.
  *G06Q 50/06* (2012.01)
  *H02J 3/00* (2006.01)

(52) U.S. Cl.
  CPC . *G05B 2219/2642* (2013.01); *H02J 2003/007* (2013.01); *Y02B 70/3225* (2013.01); *Y02B 70/3241* (2013.01); *Y02E 60/76* (2013.01); *Y04S 20/222* (2013.01); *Y04S 20/227* (2013.01); *Y04S 40/22* (2013.01)

(56) References Cited

U.S. PATENT DOCUMENTS

| | | | | |
|---|---|---|---|---|
| 9,534,928 | B2* | 1/2017 | Taft | G01D 4/002 |
| 9,847,644 | B2* | 12/2017 | Muller | H02J 3/383 |
| 2002/0103745 | A1* | 8/2002 | Lof | F03D 9/005 |
| | | | | 705/37 |
| 2005/0234600 | A1* | 10/2005 | Boucher | G06Q 30/02 |
| | | | | 700/286 |
| 2008/0188955 | A1* | 8/2008 | Dittes | G05B 17/02 |
| | | | | 700/19 |
| 2009/0093916 | A1* | 4/2009 | Parsonnet | F24F 5/0017 |
| | | | | 700/286 |
| 2009/0281673 | A1* | 11/2009 | Taft | G01D 4/002 |
| | | | | 700/286 |
| 2010/0138066 | A1* | 6/2010 | Kong | G06Q 30/018 |
| | | | | 700/295 |
| 2010/0179704 | A1* | 7/2010 | Ozog | G06Q 10/06315 |
| | | | | 700/291 |
| 2011/0106321 | A1* | 5/2011 | Cherian | H02J 3/00 |
| | | | | 700/286 |
| 2011/0196546 | A1* | 8/2011 | Muller | H02J 3/383 |
| | | | | 700/295 |
| 2011/0231028 | A1* | 9/2011 | Ozog | G06Q 10/06 |
| | | | | 700/291 |
| 2012/0029720 | A1* | 2/2012 | Cherian | H02J 13/00 |
| | | | | 700/297 |
| 2012/0029897 | A1* | 2/2012 | Cherian | H02J 3/00 |
| | | | | 703/18 |
| 2012/0083930 | A1* | 4/2012 | Ilic | G06Q 30/06 |
| | | | | 700/287 |
| 2012/0130556 | A1* | 5/2012 | Marhoefer | H02J 3/32 |
| | | | | 700/291 |
| 2012/0296799 | A1* | 11/2012 | Playfair | G06Q 10/00 |
| | | | | 705/37 |
| 2013/0036311 | A1* | 2/2013 | Akyol | H04L 63/08 |
| | | | | 713/189 |
| 2013/0166085 | A1* | 6/2013 | Cherian | G05B 13/02 |
| | | | | 700/291 |
| 2013/0253898 | A1* | 9/2013 | Meagher | G06F 17/5009 |
| | | | | 703/18 |
| 2014/0351010 | A1* | 11/2014 | Kong | G05F 1/66 |
| | | | | 705/7.29 |
| 2015/0381089 | A1* | 12/2015 | Tarnowski | H02J 3/24 |
| | | | | 307/84 |

OTHER PUBLICATIONS

Svetina, M. and Nemcek, P., "Virtual Power Plants and Utilities", 2011, Metering International, Iss 3.*
De Martini, P., "DR 2.0, A Future of Customer Response", Jul. 2013, Association for Demand Response and Smart Grid.*
Kumagai, J., "Virtual Power Plants, Real Power", Feb. 24, 2012, IEEE Spectrum.*
Palma-Behnke, R.; Benavides, C.; Aranda, E.; Llanos, J. and Saez, D., "Energy Management System for a Renewable based Microgrid with a Demand Side Management Mechanism", 2011, IEEE.*
Kok, K.; Warmer, C.; Kamphuis, R.; Mellstrand, P. and Gustaysson, R., "Distributed Control in the Electricity Infrastructure", 2005, 2005 Intl. Conf. on Future Power Systems.*
Fang, X.; Misra, S.; Xue, G. and Yang, D., "Smart Grid—The New and Improved Power Grid: A Survey", 2012, IEEE Communications Surveys and Tutorials, vol. 14, No. 4.*
Buchholz, B.; Nestle, D. and Kiessling, A., "Individual Customers Influence on the Operation of Virtual Power Plants", 2009, IEEE.*
Binding, C.; Grantenbein, D.; Jansen, B.; Sundstrom, O.; Andersen, P.B.; Marra, F.; Poulsen, B. and Traeholt, C., "Electric Vehicle Fleet Integration in the Danish Edison Project—A virtual Power Plant on th elsland of Bornholm", 2010, IEEE.*

* cited by examiner

MODEL AND CONTROL VIRTUAL POWER PLANT PERFORMANCE

CROSS-REFERENCE TO RELATED APPLICATIONS

This application claims priority to U.S. Provisional patent application No. 61/794,067 filed Mar. 15, 2013, the entire content of which is hereby incorporated by reference.

Applicant has other co-pending applications directed to the energy market, namely:

SYSTEMS AND METHODS FOR DEMAND RESPONSE AND DISTRIBUTED ENERGY RESOURCE MANAGEMENT, filed Feb. 9, 2011 and assigned application Ser. No. 13/024,158, the entire contents of which is hereby incorporated by reference.

AUTOMATION OF ENERGY TRADING, filed Dec. 30, 2011 and assigned application Ser. No. 13/140,248, the entire contents of which is hereby incorporated by reference.

CERTIFICATE INSTALLATION AND DELIVERY PROCESS, FOUR FACTOR AUTHENTICATION, AND APPLICATIONS UTILIZING SAME, filed Oct. 15, 2013 and assigned application Ser. No. 14/054,611, the entire contents of which is hereby incorporated by reference.

A renewable energy credit management system and method, filed Feb. 10, 2014 and assigned application Ser. No. 14/176,590, the entire contents of which is hereby incorporated by reference.

Systems and methods of determining optimal scheduling and dispatch of power resources, filed on Mar. 17, 2014 application Ser. No. 14/216,138, which issued Jan. 9, 2018 as U.S. Pat. No. 9,865,024, the entire contents of which is hereby incorporated by reference.

Systems and methods for managing energy generation and procurement, filed on Mar. 17, 2014 application Ser. No. 14/216,148, the entire contents of which is hereby incorporated by reference.

Systems and methods for trading electrical power, filed on Mar. 17, 2014 application Ser. No. 14/216,163, the entire contents of which is hereby incorporated by reference.

Systems and methods for managing conditional curtailment options, filed on Mar. 17, 2014 application Ser. No. 14/216,179, the entire contents of which is hereby incorporated by reference.

Systems and methods for tracking greenhouse gas emissions, filed on Mar. 17, 2014 application Ser. No. 14/216,196, the entire contents of which is hereby incorporated by reference.

Systems and methods for parameter estimation for use in determining value-at-risk, filed on Mar. 17, 2014 application Ser. No. 14/216,209, the entire contents of which is hereby incorporated by reference.

Systems and methods for managing transmission service reservations, filed on Mar. 17, 2014 application Ser. No. 14/216,226, the entire contents of which is hereby incorporated by reference.

Systems and methods for interfacing an electrical energy end user with a utility, filed on Mar. 17, 2014 application Ser. No. 14/216,234, the entire contents of which is hereby incorporated by reference.

STATEMENT REGARDING FEDERALLY SPONSORED RESEARCH

Not Applicable

FIELD OF THE INVENTION

The present disclosure relates generally to electric power/energy and, more particularly, to systems and methods of modeling individual power/energy generation and demand resources and then aggregating these resources for various uses.

BACKGROUND OF THE INVENTION

The reliable operation of the electric power system requires maintaining a balance between the total supply (i.e., generation and imports) and the total demand (i.e., load and exports) at any given time. Under guidelines established by the North American Electric Reliability Corporation (NERC) that regulate the reliability of power system operations, the North American power grid is divided into many adjacent balancing areas, each responsible for maintaining the balance between the supply and demand in their respective region. To achieve the balance in a most economic fashion, the electric utility industry has historically utilized load forecasting and economic dispatch optimization systems to optimize the scheduling of generation resources in such a way as to minimize the cost for the production of electrical energy sufficient to meet the forecasted demand, while taking into account capacity reserved for contingency reserves and regulation (ancillary services), and then dispatch these resources in real time to maintain the supply and demand balance and meet the energy demand of the utilities' consumers at least cost. These economic dispatch optimization systems typically consider the generation from facilities under the control of a single Balancing Area, for example energy generating plants fueled by natural gas, coal, nuclear fuel, water (hydro), oil, and refuse, as well as energy available for purchase from electricity suppliers on an energy market, as an import. In order to match forecasted load and meet real-time electricity demand, entities utilizing economic dispatch optimization systems typically increase or decrease generation from particular generation units. The environmental regulations and consumer sentiment of the recent years have resulted in a rapidly expanding portfolio of renewable energy resources in many regions. The renewable generation resources such as, solar and wind power facilities, are generally non-dispatchable and due to their dependence on the amount of pertinent natural resources (e.g., sunshine, wind, etc.) have variable generation patterns, and thus they are referred to as Variable Energy Resources (VER). Nearly all utility companies have now established a trend to incorporate electrical generation from VERs into their generation portfolio. The real time availability as well as accurate long term forecast of natural resources, such as sunlight (unblocked by cloud cover) and wind, remain unpredictable to an absolute degree; although some short term forecasting modeling for cloud cover and wind speed is beginning to yield more accurate predictions on such resource availability. If a stray cloud shields a solar panel array from the sun, there is a near instant impact to the generating capacity output of a solar generation resource, which an electrical utility will have to compensate for through acquiring additional generation from another source. If that same stray cloud then moves on a few short minutes later, the generating output is then ramped back up to a higher capacity. Again, the Balancing Area must readjust generation resources to match the real-time electric demand through its economic dispatch optimization system or other method. Purchase of additional electrical energy from a market, especially during an emergency or on short-notice basis, for balancing periodic generation fluctuations can be costly with such incurred costs passed on to the electricity consumer. Moreover, adjusting the generating output of other traditional generation resources, most notably coal fire generation plants, on an intra-hour basis for short periods of time to mitigate fluctuations to generation output is also costly, if even possible given the physical ramping constraints associated with many such generation facilities.

Use of Demand Response

The use of demand response (DR) to reduce electrical energy demand is well known to electrical utilities. Electric utilities have encouraged consumers to enroll their electrical assets, such as, but not necessarily limited to water heaters, air conditioners and pool pumps, into demand response programs, permitting the electrical utility to cycle or even turn off the enrolled asset to shed load during peak consumption periods (or as otherwise contractually agreed upon). Programs were established to include groups of like assets across a generally shared locality.

Traditionally, electrical utilities have initiated demand response events under emergency conditions without an accurate prediction of available DR. An electrical utility would initiate a DR event to cycle, turn off or otherwise reduce the electrical energy demand of ideally all assets enrolled in a particular program. In practice, an asset may be unresponsive to a DR event initiation signal or may never receive the signal at all. Moreover, asset owners may have the contractual ability to opt-out of certain DR events. The electrical demand of enrolled assets may change based on a variety of factors, including by not limited to external or ambient meteorological conditions (e.g., temperature and humidity), the condition and age of the asset, the time of day or the day type (e.g., work day, weekend, etc.), contractual parameters, and recent history of asset dispatch. Electric utilities have thus far not utilized DR to provide flexible reserves and load following capabilities needed to mitigate variable generation. In fact, utilities generally rely on expensive regulation to absorb the fluctuations of VER, and on Contingency Reserves to mitigate sudden large changes in VER output. The use of load following and ramping products to mitigate variable generation is emerging but is generally limited to provision of these services from dispatchable generation resources. Using DR for provision of such products has been a missing gap in this regard.

Electrical utilities are also unable to accurately predict and account for the amount of available load reduction capacity as well as ramp time for a DR event to begin to be realized. The amount of available load reduction is a function of operating status of the participating assets, ambient conditions and other factors that may not be under control of the electric utility. The initiation of DR events necessarily requires communication of control commands from a dispatch point to all assets participating in the designated DR program. In practice, such communication has historically been accomplished through utilization of many methods such as one-way radio signals, power line carriers, and telephone notifications. More recently, the energy industry has begun to incorporate additional communication methods and protocols for communicating DR events along with corresponding device telemetry, including but not limited to incorporating Wi-Fi, cellular, and various internet methods. Previous one-way networks were more costly and have lower levels of performance. Regardless of the communication method used, electrical utilities also have been unable to accurately and effectively predict and account for the amount of time every individual asset enrolled within a DR program requires for receiving and then responding to a DR event initiation signal. Without such accurate available capacity and ramping information, the real-time utilization of DR as a dependable source of flexible reserve remains infeasible for electrical utilities.

Moreover, electrical consumers have also begun to incorporate additional distributed energy resources (DERs), such as but not necessarily limited to solar panels, backup generation, electric cars, electric battery storage, thermal storage units, among others, in order to reduce their electricity bill or make better use of electric supply. Although the physical characteristics and capacities of many DERs are well known and predictable with incorporation of various real time factors, such as ambient temperature, the accurate modeling of power output and aggregation of multiple DERs is lacking in accuracy and reliability. The power output of DERs must likewise be more precisely modeled and predicted before they can become a dependable flexible reserve source.

Also absent from electrical utilities capability has been the ability to accurately model the effective duration of use of any particular DER. The electrical power output of a DER can be affected by any number of factors, including but not limited to type of unit, wear on the unit or its components, ambient temperature and light, and fuel resource availability or quality. Thus electrical utilities have been unable to dependably utilize DERs for accurate periods of time to mitigate the effects of periodic generation output fluctuations.

Thus, while generally beneficial for the utility to shed a portion of load during periods of peak demand by utilizing DR or incorporating additional generation from DERs, without more dependable and accurate prediction of load shed, anticipation of ramp period, and modeling of effective generation duration, electric utilities have been unable to fully and precisely incorporate DR and DER assets as operating and flexible reserve generation resources in order to mitigate the periodic fluctuations in generation output inherent with the utilization of VERs to balance generation with load demand in real time.

BRIEF SUMMARY OF THE INVENTION

In general, this disclosure is directed toward accurately modeling the available capacity, ramping, and effective durational use of DR and DER resources and the subsequent aggregation of such modeled assets into resources for various uses, including but not necessarily limited to the creation of dependable operating and flexible reserve resource capacity for use in mitigating the effects of periodic electric generation fluctuations due to variability and unpredictability of output of VERs, using demand response and storage capabilities as reserve capacity to satisfy ramping and regulation requirements, and in a look-ahead time frame using these capabilities for economic optimization of supply and demand while considering VER forecast. Using the systems and methods described in this disclosure, the electrical generation capacity output of DR and DER resources can be accurately modeled and aggregated into one or more Virtual Power Plants (VPPs), with an accurately predictable output capacity and capabilities determined in real time.

With the continued lower costs of electronic sensing and control devices paired with advancements in communication technologies, and more specifically paired with advancement in communication protocols, such as but not necessarily limited to ZigBee and XMPP, which facilitate reliable two-way telemetry and heartbeat communications as well as remote control capabilities, the operating status of individual assets can be incorporated into the modeling for individual assets as well as for the aggregation of assets into a localized VPP.

In at least one embodiment, this disclosure is directed to a computer program for use with a graphics display device, the computer program comprising a computer usable medium having computer readable program code means embodied in the medium for facilitating the systems and methods described herein, more specifically computer program code for the input of various data, user enrollment, and registration of assets, calculation and modeling of asset characteristics, aggregation of modeled assets and asset characteristics, and revaluation and/or recalculation of asset models.

In one example, this disclosure is directed to a method comprising the addition of enrolled DR or DER asset information, identifying the asset's classification based on the provided asset information, modeling the characteristics of individual assets, capturing location of assets on the electric distribution grid, and then aggregating and mapping the enrolled assets into VPPs as desired.

The invention may take the form of a system for modeling the capacity, ramping, and effective durational use of available DR and DER resources and subsequent aggregation of such modeled assets for various uses, configured to:
  enter enrolled DR or DER asset information,
  assess the asset's qualification,
  identify the asset's classification, location, and relevant parameters,
  model the characteristics of individual assets,
  aggregate the enrolled assets, and map them into VPPs,
  Forecast VPPs capacity for mitigating the impact of VER, and
  dispatch VPPs to minimize supply and demand imbalance due to VER.

The invention may also include a method to model capacity, ramping and effective durational use of available DR and DER resources and then subsequently aggregate such modeled assets for various uses by:
  entering enrolled DR or DER asset information,
  assessing the asset's qualifications,
  identifying the asset's classification, location, and relevant parameters,
  modeling the characteristics of individual assets,
  aggregating the enrolled assets, and map them into VPPs,
  Forecast VPPs capacity for mitigating the impact of VER, and
  dispatch VPPs to minimize supply and demand imbalance due to VER.

The details of one or more aspects of the disclosure are set forth in the accompanying drawings and the description below. Other features, objects, and advantages will be apparent from the description and drawings, and from the claims.

DETAILED DESCRIPTION OF THE INVENTION

Overview

Figure 1:
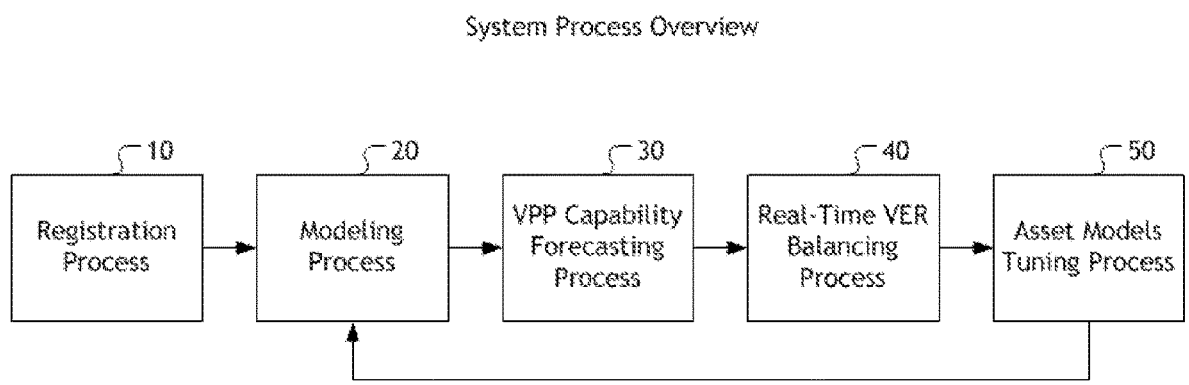
FIG. 1 is a flow chart of the general components of the demand response (DR)/distributed energy resource (DER) system and method for mitigating the impact of VER according to one embodiment of the present invention.

FIG. 1 is a flow chart illustrating a broad overview of the processes in a preferred embodiment of the present invention. In registration process 10, DR/DER assets are registered in a DR/DER program and ranked on their qualifications for such a program, and data are gathered on the assets' location on the electric distribution grid, usage and contractual parameters, load and generation capabilities, among others. In modeling process 20, the asset data gathered in registration process 10 are translated to parameters that are directly indicative of the asset's potential performance as part of a VPP. Examples of these parameters include available capacity for curtailment and the delay between the time a curtailment command is sent to an asset and the time the benefits from curtailing the asset's load are made available. This translated asset data is used to aggregate assets into VPPs. In VPP capability forecasting process 30, contemporaneous and near-future data are recorded and used to forecast the expected capability of a VPP in the near future. In real-time VER balancing process 40, contemporaneous and near-future electric power supply and demand imbalances are compared to contemporaneous and near-future VPP capability to determine whether one or more VPPs may be utilized to balance said imbalances. Finally, in asset model tuning process 50, the capabilities of VPPs are heuristically updated using actual performance of dispatched assets in DR/DER events as compared to the forecasted performance. In one embodiment these processes can be programmed through a computer application for autonomous execution.

Figure 2:
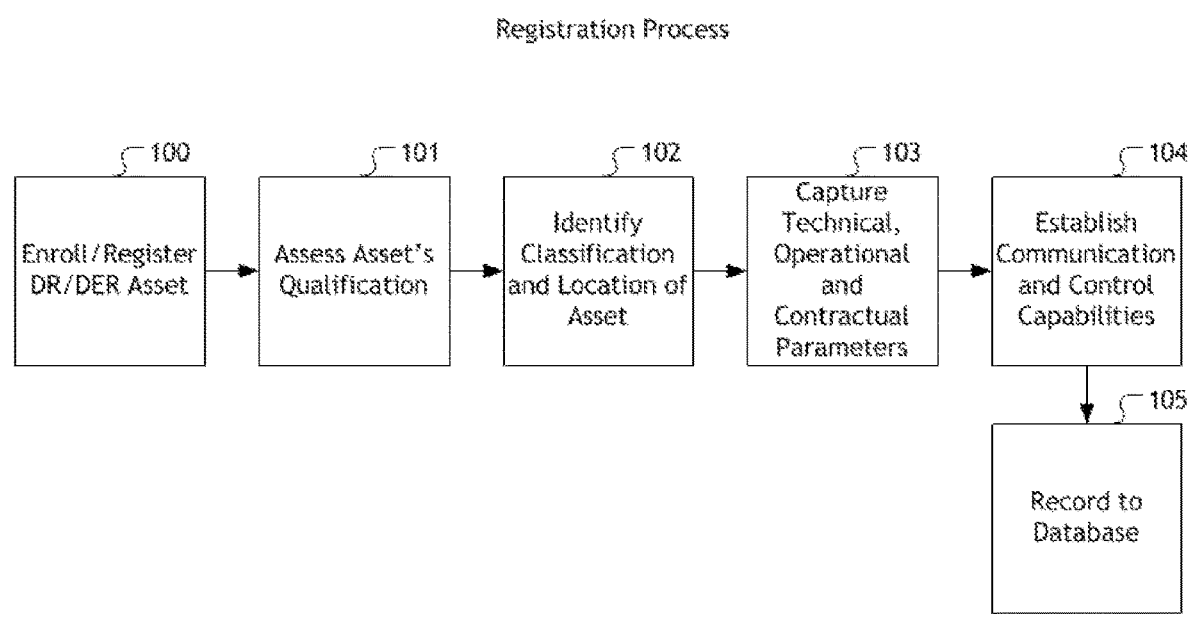
FIG. 2 is a flow chart of an embodiment of the registration process for a DR/DER asset.

FIG. 2 is a flow chart of a particular embodiment depicting the process by which a DR/DER asset can be registered or enrolled. As shown in FIG. 2, a DR/DER asset that is enrolled or registered into an applicable program 100 must meet certain qualifications (step 101) in order to participate in the disclosed method and process. Qualifications may include that the assets have a fast response rate for dispatch in order to support the balancing of variable energy generation. In order for the asset to have the capability of responding to dispatch signals in a short time frame, such as from a few seconds to one minute, the asset may need to be equipped with a direct-load-control capability or be supported by an operator on a 24×7 basis.

After assessing the qualifications 101 of the asset, the asset's classification and location are identified 102. Classification may be based on criteria such as, but not necessarily limited to, load, generation, and storage. An asset's location on the electric grid may be determined through any number of methods known in the art, including but not limited to, identifying the circuits, transformer, and substation to which the DR/DER asset may be connected.

In addition, the technical, operational, and contractual parameters of the asset are captured 103. There are many ways such information can be retrieved, depending on the type of asset. Some assets, such as smart appliances, may have some of this information loaded within their memory and may have the capability to communicate it. Parameters for other assets may be available by, for example, querying related databases or contacting asset owners. Technical parameters may comprise nameplate capacity, i.e. the load an asset would consume if constantly operating at full capability, cycling capability, and minimum load, among others. Operational parameters may comprise modes of operation and ramping time, among others. Contractual parameters may comprise dispatch availability time windows, maximum dispatch time interval, and maximum number of dispatches in a time period, among others.

Once technical, operation and contractual parameters are captured 103, the communications and control capabilities of the asset are established 104. The asset's data communications parameters for the dispatch, control, and monitoring of the asset's performance are identified. Such parameters may include data communication types such as, but not necessarily limited to, internet, radio, or cellular communication. Additional parameters may include data communications address and associated parameters, data communications security codes, and data communications protocol. Control device capabilities and modes of operations also need to be identified.

Finally, information captured during the asset enrollment or registration process can be stored in a computer database 105 for further use.

At any point during the registration process it may be desired to remove assets from consideration as VPP components if said assets' characteristics make them unfit for inclusion in a VPP. In preferred embodiments the assessment of asset's qualification (step 101) would include such means. This may be performed, for example, concurrently with qualification assessment, by only allowing those assets that meet the qualifications to proceed to step 102. This may also be performed after all asset information has been collected in steps 101-104, by preventing the collected information relating to assets that did not meet the qualifications from being recorded in step 105. Alternatively, the assessment of asset's qualification may allow non-qualifying assets to proceed through all registration steps 100-105, but may flag all information relating to those assets to prevent the assets from being considered in further processes 20-50.

Asset registration is presented as a linear process in the embodiment illustrated by FIG. 2 for ease-of-presentation purposes only. In other embodiments steps 101, 102, 103, and 104 may occur in any order, or may occur simultaneously.

Modeling Process

Figure 3:
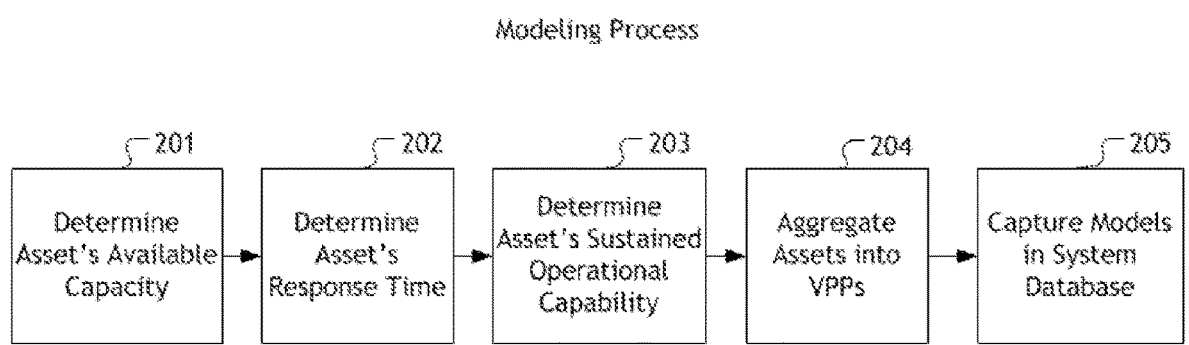
FIG. 3 is a flow chart of an embodiment of the asset modeling process.

FIG. 3 is a flow chart of a particular embodiment of the Modeling Process 20 wherein the asset information captured during the Registration Process 10 is modeled and aggregated into VPPs. As part of the modeling process, asset information may be translated from a load-consumption perspective to industry standard parameters that may be used to evaluate the asset's performance as a VPP.

Asset's available capacity to contribute to a VPP, i.e., to be curtailed as part of a DR event, is modeled 201 by adjusting the asset's nameplate capacity according to time-based parameters related to the asset's operation and energy-consumption patterns. This may include, but is not limited to, environmental data and data related to the asset's set-point, i.e., the level to which the asset has been set to run by the asset owner. For example, a residential air-conditioning unit may have a nameplate capacity of 1.75 kilowatts. However, if the heat index at asset's location were relatively low and the air temperature the asset is typically programmed to maintain (the air conditioner's set-point) during the relevant period in the day were relatively high, the air conditioning unit would be expected to consume load infrequently. In this case the air conditioner may be expected to consume only 0.20 kilowatts on the average over the time period. Thus, the air conditioner's available capacity for curtailment may be estimated 201 by weighting the nameplate capacity by the time-based parameters, i.e. the heat-index patterns and the set-point patterns.

As a further example, a residential water heater may have a nameplate capacity of 1.00 kilowatt. However, if the water heater's owner typically uses very little water at the relevant point in the day, the water heater would be expected to consume load infrequently. In this case the water heater may be expected to consume only 0.10 kilowatts on the average over this time period. Thus, the water heater's available capacity for curtailment may be estimated 201 by weighting the nameplate capacity by time-based hot-water usage patterns.

The energy-consumption patterns of different types of assets may be affected by different time-based parameters. Thus, determining an asset's available capacity 201 will require the nameplate capacity to be weighted by different time-based parameters for different types of assets. In preferred embodiments, all parameters that may have an effect on the likely usage of an asset will be included when determining asset's available capacity 201.

Asset's response time to a dispatch signal, i.e., the amount of time between sending a dispatch signal to asset and the asset reducing its energy consumption by the desired amount, may be modeled 202 by adding the time intervals between the time for a DR/DER dispatch decision is made to the time it takes the asset to change its load consumption upon receiving a signal. The time required for a dispatch signal to travel to the DR/DER asset may be affected, for example, by the method by which the signal is sent. The time it takes for the asset to change its load consumption may be affected, for example, by the operating state of the asset, and the time of day. Further, the DR/DER programs in which some assets are enrolled may require prior notification of at least a certain amount of time before assets could be curtailed. In those programs, that required notification time should also be added in the determination of the asset's response time 202.

The asset's sustained operational capability, i.e., the period of time that an asset's load may be curtailed continuously, may be modeled 203 by adjusting the asset's available capacity (as modeled in step 201) according to, as applicable, contractual limits of the asset, the asset's capacity, and the current operating state of the asset. For example, certain DR/DER program agreements may set contractual limitations on the maximum amount of time an asset may be curtailed. These contractual limits may be dependent on the time of day or other parameters included in the program agreement. In preferred embodiments step 203 will account for all parameters included in a program agreement. The asset's capacity, for example, may be applicable to an electrical storage device; more energy stored in the storage device allows the device to be curtailed for longer. The asset's operating state may be applicable, for example, to an air conditioner wherein the temperature of the room, as compared to the air conditioner's set-point and location heat index, will have implications on how long the air conditioner could be curtailed before the temperature in the room began to rise dramatically. If contractual agreements or regulatory requirements prohibited curtailing air-conditioning units to the extent that temperatures rise a certain amount over the set-point, the air conditioner's operating state would be applicable in determining how long the air conditioner could be curtailed.

Once the individual assets are modeled according to the above analyses, they can then be aggregated into dispatchable resources or virtual power plants (VPPs) 204 for a locality, such as but not necessarily limited to, a substation. Information about the individual assets, including grid location and asset classification 102 are used to select which assets to include in each particular VPP. More specifically, for a particular substation, information including but not necessary limited to asset type, response time, computing capacity, grid location, and response profile for individual assets will be used for the aggregation of assets into VPPs.

The asset's modeled Available Capacity 201, Response Time 202, and Sustained Capability 203 can then be used to establish the VPP 204 operating parameters. Such parameters comprise a VPP's maximum capacity (or Pmax), the VPP's available ramp rate, and available energy or operating duration, among others. Using these models, the values of these parameters are determined for the current time period and forecasted for the near-future time frame, e.g., the next several hours at a 5 minute time resolution. The resulting information may then be stored 205 for further use or later recall and access.

At any point during the modeling process it may be desirable to remove certain assets from consideration as a VPP component. In preferred embodiments this may be incorporated as part of any of determining asset's available capacity 201, determining asset's response time 202, and determining asset's sustained operational capability 203. If, for example, an asset's response time as a VPP component is determined 202 to be too slow for VPP purposes, the system would not determine asset's sustained operational capability 203, and thus the asset would not be aggregated into a VPP 204.

Modeling is presented as a linear process in the embodiment illustrated by FIG. 3 for ease-of-presentation purposes only. In other embodiments steps 201, 202, and 203, may occur in any order, or may occur simultaneously.

VPP Capability Forecasting Process

Figure 4:
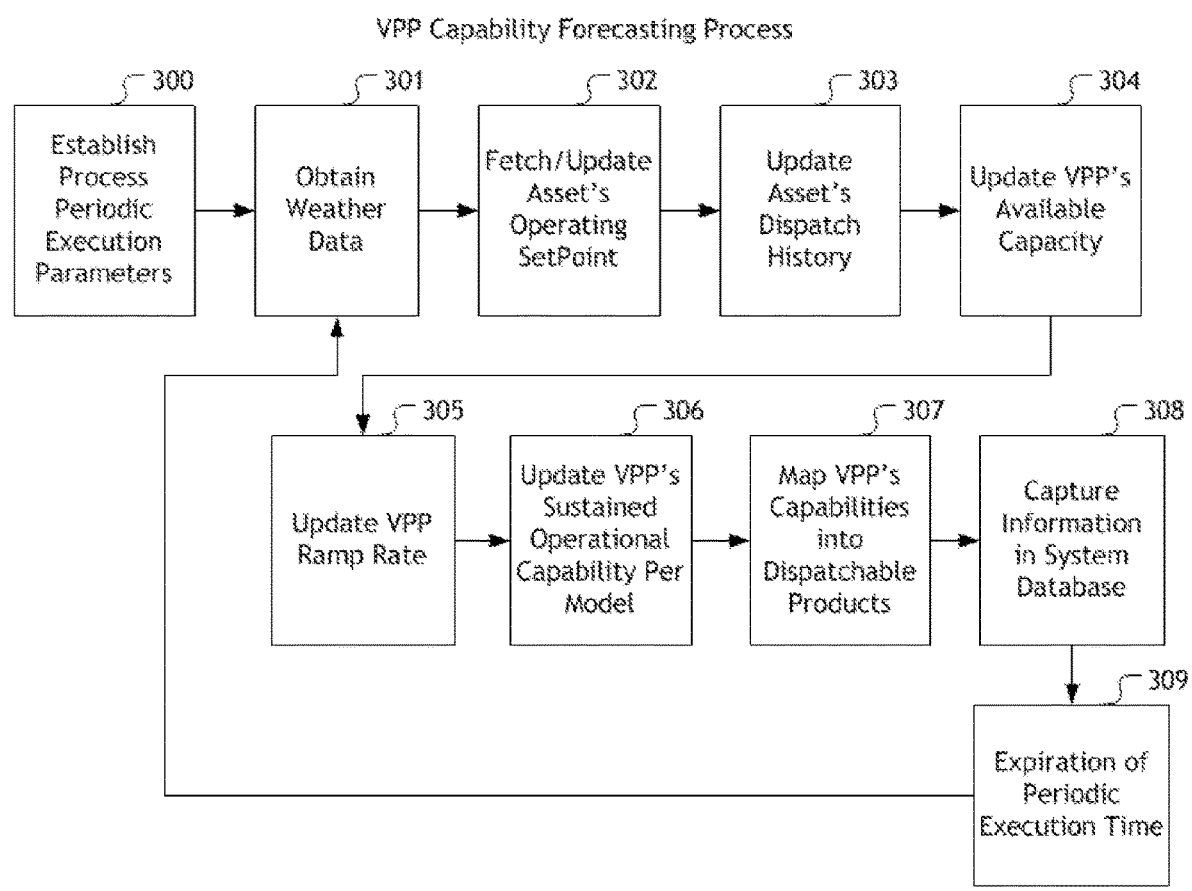
FIG. 4 is a flow chart of an embodiment of the virtual power plant (VPP) capability forecasting process.

FIG. 4 illustrates a particular embodiment of the process by which the operating parameters of a VPP's resource capabilities can be updated on an on-going basis. A periodic execution parameter 300 is established. The periodic execution parameter 300 is the time interval establishing how often the VPP Capability Forecasting Process 30 is performed, e.g., every 5 minutes. Data pertaining to near-term weather forecast for weather zones in which the assets are located may be obtained 301 from a weather service, such as the Oceanic and Atmospheric Administration (NOAA), and will be inputted into the system. Weather data may be, in this embodiment, the expected heat index of the zone in which an air-conditioning asset is located, or the expected cloud cover over a solar-panel asset on a residential roof.

Using any data communications infrastructure known in the art, such as but not necessarily limited to the infrastructure identified in step 104, the current operating set-point of the participating assets are obtained 302. For example, the set-point of a smart thermostat could be determined by remotely querying the thermostat for the temperature it is set to maintain. Similarly, as another example, the set-point of a commercial building energy management system can be obtained through communications with the building energy control system. This set-point data is considered in conjunction with the weather data obtained in step 301, and may have significant impacts on an asset's available load curtailment capacity. For example, if an air-conditioning asset is located in a weather zone that is forecasted to increase from 65 degrees Fahrenheit to 85 degrees Fahrenheit over the next hour, and the thermostat controlling that air-conditioning asset is set to maintain the temperature at 67 degrees Fahrenheit, that air-conditioning's compressor will be cycling more often demanding a larger amount of electric load, thus it will have greater available capacity for curtailment. However, if the weather zone containing the same air-conditioning asset, controlled by the same thermostat with the same set-point were forecasted to decrease from 70 degrees Fahrenheit to 55 degrees Fahrenheit over the next hour, that air-conditioning asset will be shut off by the thermostat, and will not be demanding any load, and thus does not have available capacity to be curtailed.

Demand Response and load curtailment contracts typically include parameters limiting the number of curtailments over a time period, e.g., over a day, a week, or a month, as well as limiting the duration of load curtailment. The assets' histories of prior curtailments are then updated and compared to the assets' contractual parameters 303. These contractual parameters, as identified in step 103, will determine whether an asset is available to be curtailed as part of a DR event. For example, if the contractual parameters of an asset only allow it to be curtailed as part of a DR event three times per month, and the asset had already been curtailed three times, the asset would not be available to be curtailed regardless of how much load the asset is forecasted to demand over the DR event. This would also be true if the DR event fell outside the time window that the contractual parameters allowed the asset to be curtailed as part of a DR event. Based on these parameters, and the asset's operating model, the available capacity of the asset is forecasted for the current time, and for the near-future time frame.

Based on the information from the steps 301-303, each VPP's available capacity can be accurately forecasted 304 by aggregating the operating capacity characteristics from all the individual assets included in a VPP by step 204. This step will provide for the determination of the available curtailment capacity of each VPP over the forecasting time frame.

In addition, the response times of the individual assets are aggregated into a response curve 305, known as the ramp rate of the VPP. An asset's response time presents the time period between the moment that curtailment signal is issued, to the time when the actual load reduction occurs. Since a VPP represents an aggregation of many assets, a VPP ramp rate represents the rate by which the aggregated load reduction can be realized. A VPP's ramp rate, typically captured as curve representing load reduction level as a function of time, is determined in a similar manner by considering each asset's response time models 202 from all assets aggregated within a VPP 204. This provides accurate information on how quickly the VPP's available capacity can be utilized. Similarly, the sustained operational capability of the assets that are available to be curtailed are evaluated and aggregated to update the VPP's sustained operational capability 306. This provides information on how long the available capacity of the VPP can be utilized.

A VPP's computed resource capabilities may then be mapped into dispatchable products 307, considering the VPP's ramp rate and sustained duration. These dispatchable products 307 can be made available for the desirable use, including but not necessarily limited to, balancing variable energy resources (VER) at each VPP location or trading as available electric energy, among many other uses. The VPP's available resource capacity can be designated as flexible reserve and can supplement or replace non-spinning reserve, spinning reserve, and regulation. In a particular embodiment of the invention, the forecast of a VPP's available capacity 304, ramp rate 305, sustained operational capability 306, and dispatchable product mapping 307 are captured and stored in a database for later use or recall 308.

Upon expiration of an amount of time equal to the periodic execution parameter 300, weather data may again obtained 301, and the forecast of all VPP's available capacity 304, ramp rate 305, sustained operational capability 306, and dispatchable product mapping 307 are updated based on the latest available data. In a preferred embodiment, the periodic execution parameter 300 is defined as a relatively short duration of time (typically 5 minutes), to enhance the accuracy of the forecasting by incorporating latest information and dynamic changes in weather and assets' operating conditions. At any point during the VPP Capability Forecasting process it may be desirable to remove certain assets from consideration as a VPP component for near-term dispatchable products. In preferred embodiments this may be incorporated as part of any of updating asset's dispatch history 303, updating VPP's available capacity 304, updating VPP ramp rate 305, and updating VPP's sustained operational capability per model 306. In these embodiments asset may be excluded due to any step 301-306 in which it becomes clear that the VPP's near-term capabilities are being reduced by the asset's near-term forecasted performance. If, for example, obtaining near-term weather data 301 and obtaining asset's operating set-point 302 shows that an air conditioner will not be consuming load in the near term, and thus cannot be curtailed, that asset may be excluded from consideration. The asset may also be excluded if updating asset's dispatch history 303 shows that the asset cannot be dispatched in the near-term due to contractual limitations. In any case in which an asset is excluded as part of the VPP Capability Forecasting Process, the asset may or may not be considered in future VPP Capability Forecasting Processes, depending on the circumstances.

Real-Time VER Balancing Process

Figure 5:
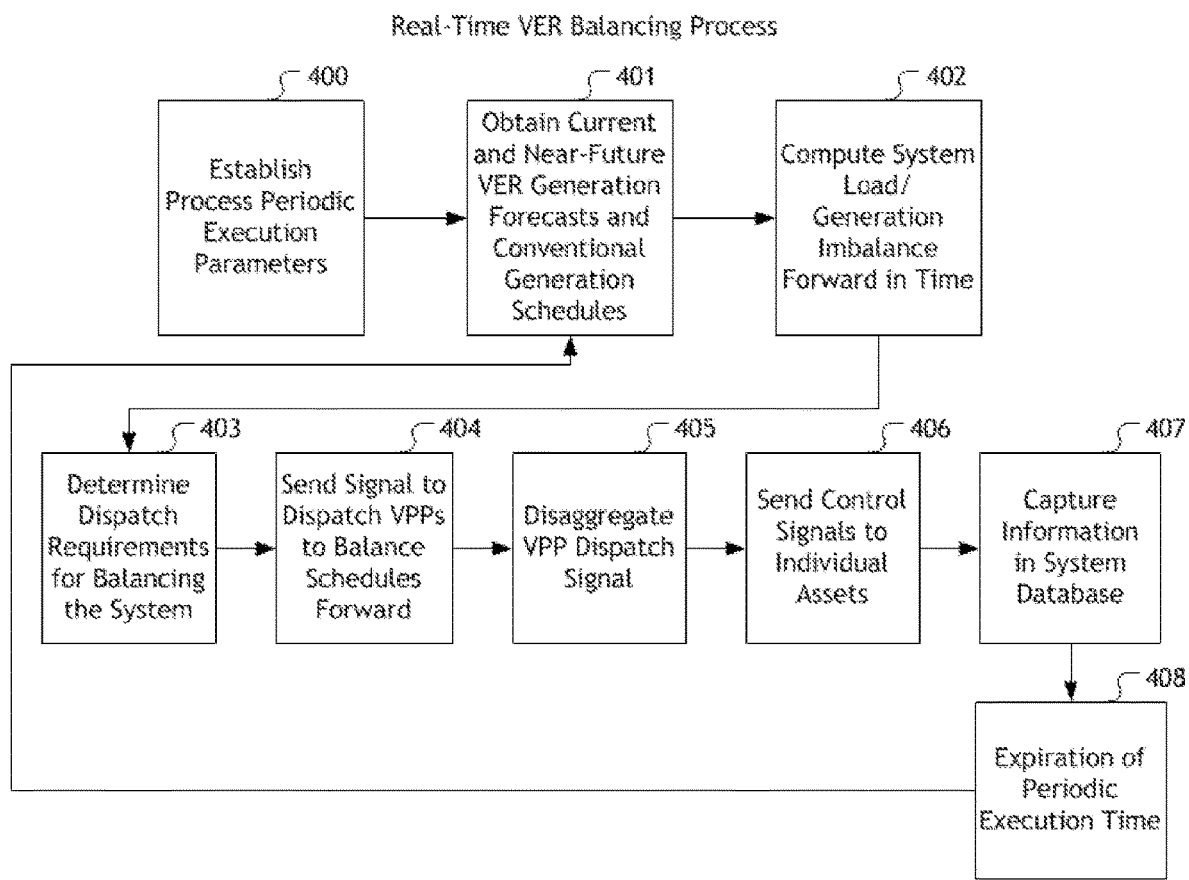
FIG. 5 is a flow chart of an embodiment of the real-time variable energy resource (VER) balancing process.

FIG. 5 illustrates an embodiment of the Real-Time VER Balancing Process 40. This process covers the activities associated with the assessment of electric power supply and demand imbalances at the current time and in the near future, and determination of whether one or more VPPs can be utilized and dispatched to provide the required balancing services to maintain the supply and demand balance at the current time and in the near future. A periodic execution parameter 400 is established. The periodic execution parameter 400 is the time interval defining how often the imbalance assessment and determination VPP dispatch schedule of Process 40 are performed e.g., every 5 minutes. The current and near-future VER generation and load are forecasted and combined with conventional generation schedules 401. VER generation may be forecasted by any method capable of effectively forecasting for the near future, but will oftentimes resemble the process disclosed in step 301 wherein near-future whether data is obtained from a weather service to forecast the productivity of solar and wind generation in the near future. In some cases weather data may be more efficiently or accurately obtained 301 by establishing sensors to measure the weather data, or cloud cover movement, in the vicinity of the assets. This may be the case, for example, when attempting to accurately predict the magnitude of wind at a wind generator asset in a near future timeframe. Wind detectors could be placed an appropriate distance away such that any wind measured by the detector would arrive at the wind generator assets location within the expected timeframe. This forecasted VER generation is combined with the predictable generation of conventional generation methods. The imbalance between the forecasted system load and forecasted system generation is computed for the near-future 402 by any means known in the art based on forecasts. VPP dispatch requirements are then determined 403 for balancing any system generation imbalance 402. The dispatch requirements of a VPP may be based solely on the imbalance of forecasted generation and forecasted load, or may also include the reserve requirements during the period of that imbalance. For example, in some instances of an energy shortage, the VPP available capacity may be large enough to correct the imbalance computed in step 402 and to provide for the power system reserve requirements established by the North American Electric Reliability Corporation (NERC). In these instances the VPP dispatch requirement, determined in step 403, could avoid the necessity of relying on conventional generation that previously provided the required spinning or non-spinning reserve.

Signals may then be sent 404 to dispatch VPPs according to such calculated dispatch requirements. In one embodiment of the invention, such dispatch signals are disaggregated 405 and sent 406 to the individual DR/DER assets. The particular assets to which these dispatch signals are sent 406 will be based, in preferred embodiments, on the information obtained from the VPP Capability Forecasting Process 30. However, in some instances determining the dispatch requirements for balancing the system 404 may reveal that not all assets in a VPP are necessary to achieve system balance. In these instances signals sent to dispatch VPPs 405 may only include a portion of the assets that make up a VPP. All information, including asset response data comprised event performance and/or device status information, among other potential data, may be captured 407 in a database for further use or recall. Upon expiration 408 of an amount of time equal to the periodic execution parameter 400, Real-Time Balancing 40 is re-executed. In a preferred embodiment, the periodic execution parameter 400 is defined as a relatively short duration of time, in order to balance the benefits of obtaining a near-real-time model of VPP characteristics against the disadvantage of increased process and calculation time, typically 5 minutes.

Asset Modeling Parameter Tuning Process

Figure 6:
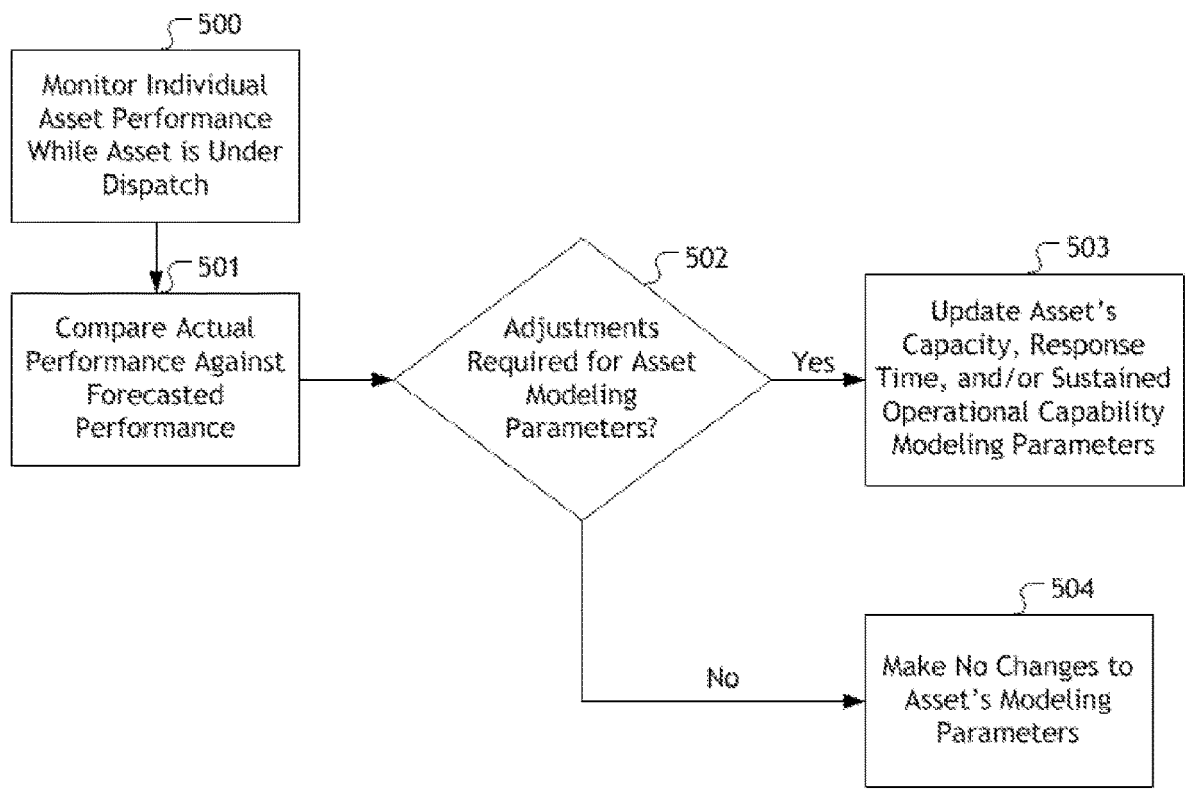
FIG. 6 is a flow chart of an embodiment of the asset modeling parameter tuning process.

FIG. 6 illustrates a particular embodiment of the Asset Modeling Parameter Tuning Process 50, which is intended to refine and adjust asset modeling parameters to increase the accuracy and efficiency of VPP modeling characteristics. The system monitors 500 each individual asset's performance while the asset is under dispatch, through receipt of data from assets 408. An embodiment of the invention may compare an asset's actual performance 501 against the performance forecasted from modeling of the same asset's characteristics. The system then determines 502 whether the differences between actual performance and forecasted performance exceed a pre-defined tolerance value, which would then trigger the system to make adjustments 503 to the asset's modeling parameters. Such tolerance setting may be set by any particular user of the system for any purpose or for any reason. If adjustments to a particular asset's modeling parameters are required 503, these adjustments are determined and incorporated through re-running the Modeling Process 20 for this particular asset. If the differences between actual performance and forecasted performance do not exceed the pre-defined tolerance value, adjustments are considered unnecessary and no changes 504 are made to the asset's modeling parameters.

Figure 7:
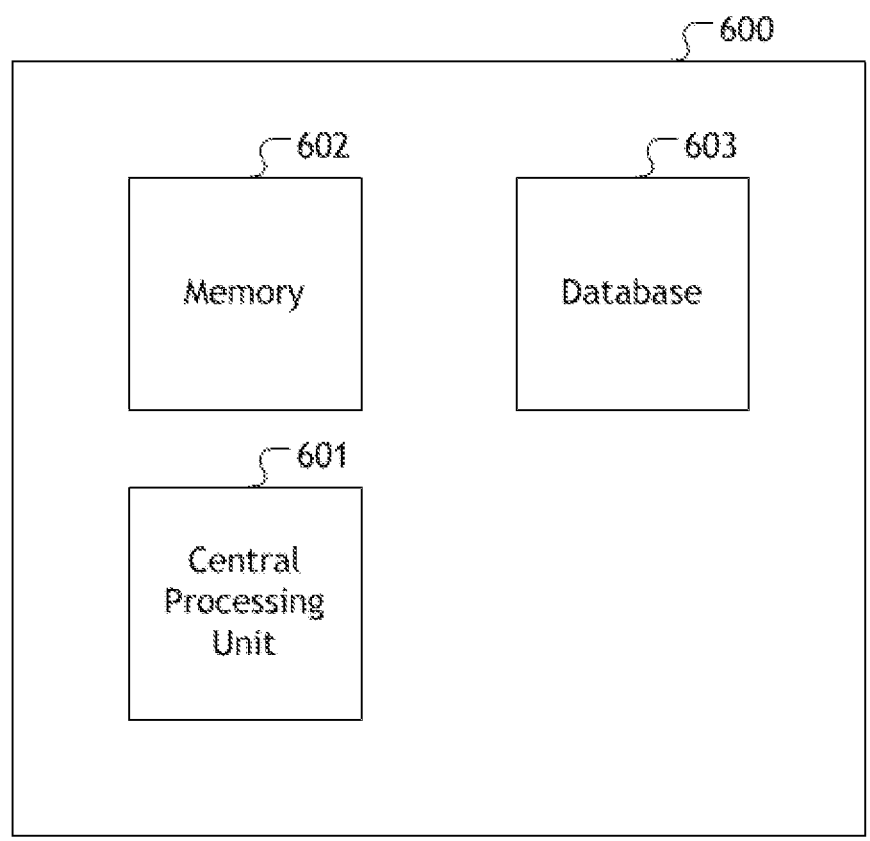
FIG. 7 is a block diagram illustrating a computer system that may be utilized in the performance of the disclosed methods and processes.

Some or all of the previously discussed embodiments may be performed utilizing a computer or computer system. An example of such a computer or computer system is illustrated in FIG. 7. Computer 600 contains Central Processing Unit 601. Central Processing Unit 601 may perform some or all of the processes involved in the previously discussed embodiments. Central Processing Unit 601 may utilize information contained in Memory 602, Database 603, or both. Central Processing Unit 601 may also write information to Memory 602, Database 603, or both. While in this FIG. 7 only one Computer 600 is shown, some embodiments may make use of multiple computers or computer systems. In some embodiments some of these computers or computer systems may not have dedicated memory or databases, and may utilize memory or databases that are external to the computer or computer system.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. A method for utilizing load-consuming assets in a demand-response program by aggregating said assets into virtual power plants (VPPs), comprising:
    registering DR or DER asset information;
    identifying the asset's classification, location, and other technical, operational, or contractual parameters as specified;
    assessing the asset's classification, location, and other technical, operational, or contractual parameter qualifications;
    forecasting VPPs capacity for mitigating the impact of VER by aggregating the operating capacity characteristics from all the individual assets;
    aggregating the enrolled assets, and map them into VPPs;
    modeling the capacity of available DR and DER assets by adjusting the asset's nameplate capacity according to time-based parameters related to the asset's operation and energy-consumption patterns;
    modeling the available ramp rate of DR and DER assets by considering each asset's response time models from all assets aggregated within a VPP;
    modeling the effective durational use of available DR and DER assets by adjusting the asset's available capacity according to, as applicable, contractual limits of the asset, the asset's capacity, and the current operating state of the asset;
    dispatching VPPs to minimize supply and demand imbalance due to VER, and
    assessing asset actual performance against forecasted performance for determination of necessity of asset modeling adjustments, and
    wherein the resulting VPP is used to provide energy resources and reserve capacities as part of a DR program.

2. The method of claim 1 wherein the assets comprise load-consuming devices and distributed energy resources.

3. The method of claim 1, wherein some said assets are excluded from VPP consideration before said modeling if they do not meet pre-established qualifications.

4. The method of claim 3, wherein said exclusion of assets is based on technical parameters.

5. The method of claim 3, wherein said exclusion of assets is based on operational parameters.

6. The method of claim 3, wherein said exclusion of assets is based on contractual parameters.

7. The method of claim 3, wherein said exclusion of assets is based on communication or control capabilities.

8. The method of claim 3, wherein some said assets are excluded from VPP consideration based on said assets' modeled potential VPP performance.

9. The method of claim 8, wherein assets' potential performance as a VPP component comprises the asset's available capacity for curtailment.

10. The method of claim 8, wherein assets' potential performance as a VPP component comprises the asset's response time to curtailment demands.

11. The method of claim 8, wherein assets' potential performance as a VPP component comprises the asset's sustained operation capability.

12. The method of claim 8, wherein said modeling the asset's potential performance as a VPP component is updated to forecast precise VPP resource capability on a near-term basis.

13. The method of claim 12, wherein said updating comprises accounting for weather data at assets' locations.

14. The method of claim 12, wherein said updating comprises accounting for time-based parameters related to the asset's energy-consumption patterns.

15. The method of claim 14, wherein said time-based parameters comprise the asset's operating set-point.

16. The method of claim 13, wherein said updating comprises accounting for the asset's contractual parameters.

17. The method of claim 1, wherein the asset is excluded from near-term VPP consideration if the asset's updated potential performance does not meet pre-established qualifications.

18. The method of claim 17, wherein a real-time balancing process is used to determine the forecasted, near-term VPP resources necessary to balance near-term supply-and-demand imbalances in the electric-power market.

19. The method of claim 18, wherein a real-time balancing process is used to determine the VPP resources necessary to balance near-term supply-and-demand imbalances in the electric-power market.

20. The method of claim 19, wherein resources from all a VPP's assets are utilized to balance said near-term supply-and-demand imbalances.

21. The method of claim 19, wherein resources from some, but not all, a VPP's assets are to provide balance said near-term supply-and-demand imbalances.

22. The method of claim 21 wherein VPP's available resource capacity is designated as flexible reserve.

23. The method of claim 22 wherein said designation is part of a market transaction.

24. The method of claim 22 wherein a VPP is deployed to mitigate the need for generation.

25. The method of claim 1 wherein VPP resource capability is a product exchanged as part of a market transaction.

26. The method of claim 1, further including the step of adjusting asset modeling parameters to increase the accuracy and efficiency of VPP modeling characteristics.

27. A system for utilizing load-consuming assets in a demand-response program by aggregating said assets into virtual power plants (VPPs), comprising:
  a computer having a memory and a computer program running in the memory, the computer program configured to:
  register DR or DER asset information;
  identify the asset's classification, location, and other technical, operational, or contractual parameters as specified;
  assess the asset's qualifications, location, and other technical, operational, or contractual parameter qualifications;
  forecast VPPs capacity for mitigating the impact of VER by aggregating the operating capacity characteristics from all the individual assets;
  aggregate the enrolled assets, and map them into VPPs;
  model the capacity of available DR and DER assets by adjusting the asset's nameplate capacity according to time-based parameters related to the asset's operation and energy-consumption patterns;
  model the ramping of available DR and DER assets by considering each asset's response time models from all assets aggregated within a VPP;
  model the effective durational use of available DR and DER assets by adjusting the asset's available capacity according to, as applicable, contractual limits of the asset, the asset's capacity, and the current operating state of the asset;
  dispatch VPPs to minimize supply and demand imbalance due to VER, and assessing asset actual performance against forecasted performance for determination of necessity of asset modeling adjustments;
  assess asset actual performance against forecasted performance for determination of necessity of asset modeling adjustments; and
  wherein the resulting VPP is used to provide energy resources and reserve capacities as part of a DR program.

* * * * *